Aug. 30, 1955     R. J. L. GASSOT     2,716,469
FLUID BRAKES FOR ROTARY MEMBERS
Filed Aug. 22, 1952     3 Sheets-Sheet 1
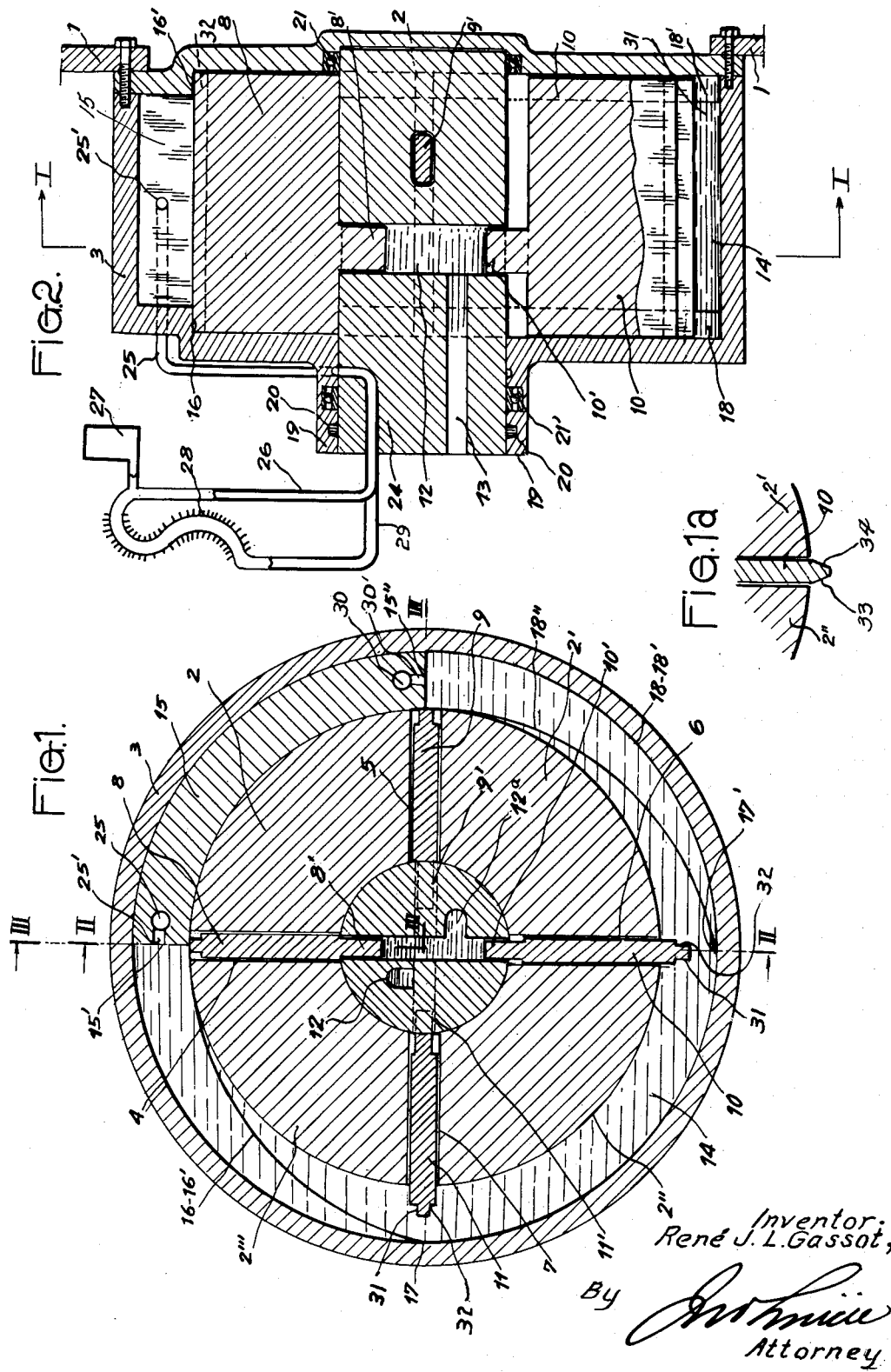
Inventor:
René J. L. Gassot,
By
Attorney Aug. 30, 1955   R. J. L. GASSOT   2,716,469
FLUID BRAKES FOR ROTARY MEMBERS
Filed Aug. 22, 1952   3 Sheets-Sheet 2
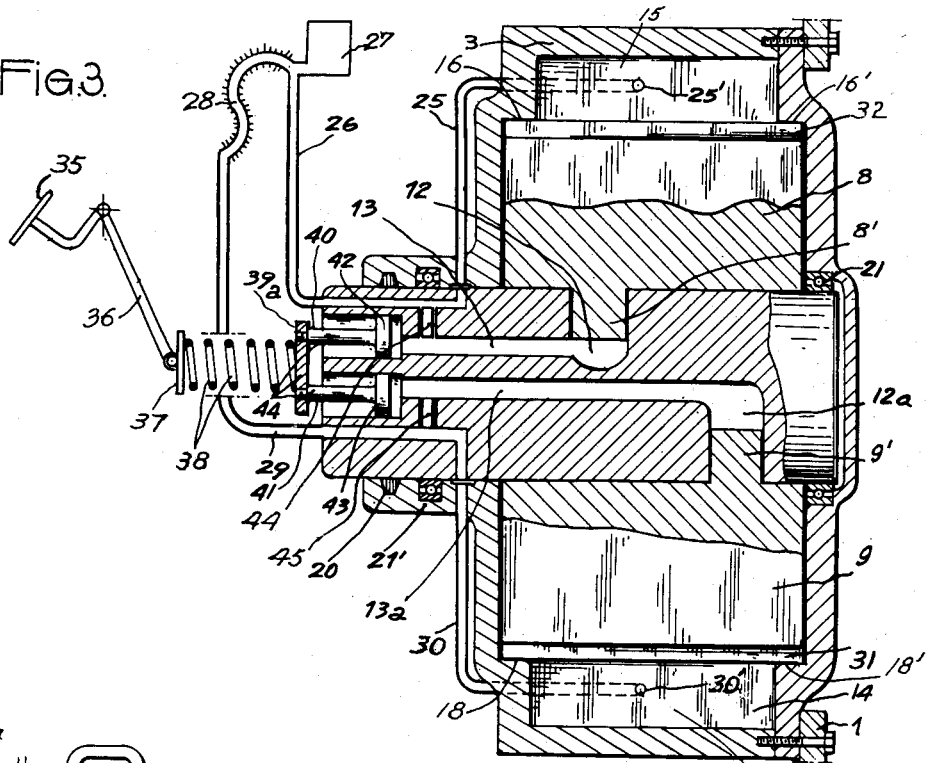
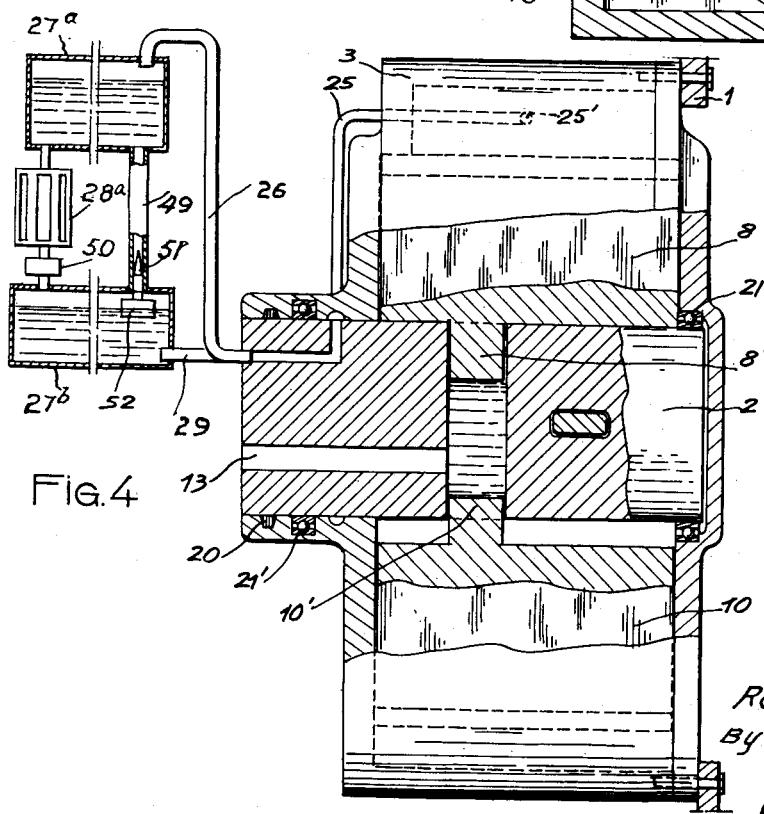
Inventor.
René J. L. Gassot,
By
Attorney Aug. 30, 1955   R. J. L. GASSOT   2,716,469
FLUID BRAKES FOR ROTARY MEMBERS
Filed Aug. 22, 1952   3 Sheets-Sheet 3
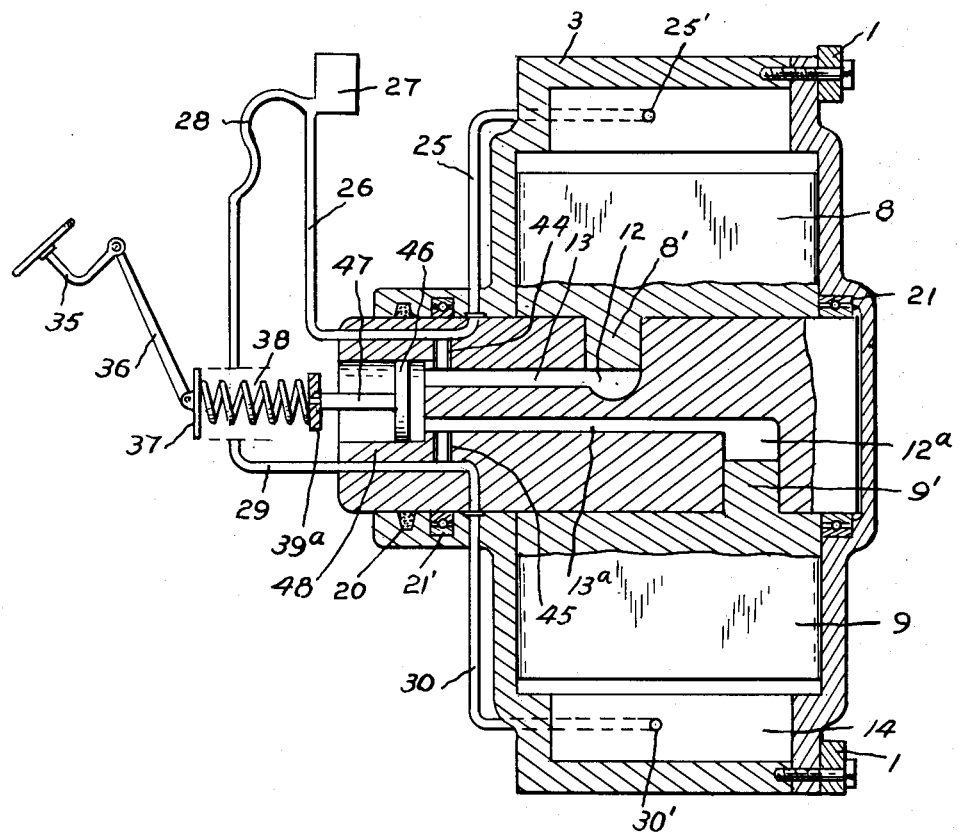
Fig_3a_
INVENTOR
René J.L. Gassot,
BY
ATTORNEY

United States Patent Office 2,716,469
Patented Aug. 30, 1955

2,716,469

FLUID BRAKES FOR ROTARY MEMBERS

René Jean Louis Gassot, Paris, France

Application August 22, 1952, Serial No. 305,740

Claims priority, application France October 23, 1947

5 Claims. (Cl. 188—90)

The present invention relates to brakes for rotary members, such as vehicle wheels, rotary parts of a machine and the like, and is a continuation-in-part of application Serial No. 55,333 filed October 19, 1948, now abandoned.

The present invention relates to brakes of the type comprising a cylindrical drum on a wheel rotatably mounted in a journal, an integral core fixedly mounted on said journal inwardly of said drum, an annular chamber provided between said core and drum, a fluid in said chamber, a partition on the inner wall of the drum intersecting said chamber, guides in the fixed core, vanes sliding in said guides, means for projecting said vanes out of the core and into said chamber and lateral cam members inside of the drum on either side of the partition in order to return the vanes inside their guides before the passage of the partition.

This invention has for its object the provision of means for compensating for the heat expansion of the liquid contained in said chamber.

Another object of the invention is to provide means for cooling the hydraulic braking liquid.

A further object of the invention is to provide means adapted for restricting or interrupting the circulation for cooling purposes of the liquid in the last stage of the braking operation.

Still another object of this invention is to provide a compensating device between the control member and the vanes so that a calibrated or weighted member will control the action of said vanes.

Still further objects and advantages of the invention will be apparent from the description and claims.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

Figure 1 is a cross sectional view taken on line I—I of Fig. 2 according to the present invention;

Figure 1a is a fragmentary view of a modification of Figure 1;

Figure 2 is a cross sectional view partly diagrammatic taken on line II—II of Figure 1;

Figure 3 is a cross sectional view partly diagrammatic taken on line III—III of Figure 1 and showing a controlling device not apparent in Fig. 2;

Figure 3a is a fragmentary cross sectional view of a modification of Figure 3; and Figure 4 is a view partially in cross section and partially in elevation, showing a modification of Figure 2.

Referring now to Figures 1 and 2, a wheel 1 of a vehicle carries a drum 3 rotatable with said wheel about a fluid tight fixed cylindrical core or hub 2 secured on the wheel journal. The core 2 is composed of four sectors 2, 2', 2", 2''' with four guideways 4, 5, 6 and 7 provided therebetween, suitable vanes 8, 9, 10 and 11 being positioned with an easy sliding fit and in a substantially fluid tight manner in said guideways. The inner ends of said vanes terminate with extensions 8', 9', 10' and 11' of smaller width. These extensions act as piston members in corresponding recesses of the central core 2, the vane extensions 8' and 10' cooperating with a pair of recesses communicating with a first chamber 12a, while the other vane extensions 9' and 11' cooperate with another pair of recesses communicating with a second chamber 12, both chambers 12a and 12 being connected with a passage 13, or two passages 13, 13a supplied with fluid under pressure from a master control cylinder.

The drum 3 is spaced from the outer periphery of the core 2 so as to leave between both elements an annular passage 14 having a substantially constant peripheral section. A partition 15 is provided on the inner periphery of the drum 3, having the same radial and depth dimensions as the passage 14, and surrounding the core 2 on a quarter of its periphery. Provided on each of both sides of said partition or flange 15 are two laterally extended thin cam-forming slopes 16—16', 18—18' also extending each on 90° and so disposed that cam members 16 and 16' thereof extend from the inner concentric periphery 17 of the drum 3 to the edge 15' of partition 15, while the cam members 18 and 18' extend from the inner periphery 17' of the drum 3 to the edge 15" of the flange 15.

The drum 3 rotates on the wheel stub axle 24 through a hub or ring portion 19, suitable ball bearings 21' and a packing ring 20 being interposed therebetween.

A conduit 25 opening at 25' into the annular passage 14 at one end of the partition 15 is fitted integrally with the assembly 3, 15 which rotates with the wheel. This conduit 25 communicates with another conduit 26 drilled in the stub axle 24 and leading with its outer end to a tank 27 and through a cooling radiator 28. The liquid escaping from the radiator 28 is directed by a conduit 29, similar to conduit 26 (Figs. 2 and 3), in a conduit 30 (Fig. 3) which opens in 30' (Figs. 1 and 3) at the other end of the partition 15, in the annular passage 14. Thus a portion of the liquid being in channel 14 under braking pressure and under heat expansion may leave the brake by the calibrated port 25' or port 30' as the system operates in one or the other direction, and then passes through ducts 25 and 26 and reaches the radiator 28 where it is cooled.

The tank 27 is designed so as to compensate for any accidental loss of liquid.

29 is a pipe and 30 a duct in the partition for the return of the liquid through the port 30'. The return of fluid is ensured by gravity with the help of the depression that occurs on the side of the partition opposed to the side where the braking pressure takes place.

The aforesaid packing ring 20 provides a suitable fluid tight connection between the rotating pipe 25 and the fixed pipe 26 secured on the stub axle 24.

As will be seen from Figure 1, the vanes 7 to 10 each comprises at its end, shoulders 31, 32, one of which is constantly exposed to the pressure obtaining inside the channel 14, the other one being used for reverse operation so that this pressure opposing the pressure of the control fluid obtaining in chambers 12, 12a balances the vanes projected by this latter pressure in such a manner that they protrude more or less into the channel 14 according to the strength applied on the pedal of the brake, generating the pressure inside the chambers 12, 12a through a spring 38 (Figure 3). The degree of protruding of the vanes in the channel 14 for a given pressure on the pedal is thus a function of the speed of rotation of the drum 3 and consequently of that of the fluid it displaces, of the viscosity of the fluid used, of the general tightness of the brake, of the amount of liquid issuing to the effect of cooling.

In the modification of Figure 1a, the vanes 7 to 10 comprise bevels or oblique surfaces 33, 34, exposed to the pressure obtaining in channel 14 at the place of the shoulders 31, 32 of Figure 1.

The above-described device operates as follows:

Upon the driver depressing the brake pedal, pressure is generated in the chambers 12 and 12a by the action of the conventional hydraulic system, so that the vanes 8, 9, 10, 11 are projected outwards partially or wholly according to the pressure generated in chambers 12, 12a, except where such vanes are located opposite to the partition 15 and the cam surfaces 16, 16', 18, 18'. The drum 3 being rotated with the wheel, the fluid displaced by the wall 15' or the wall 15" of the partition, depending on the direction of rotation of the wheel, is stopped by said vanes to the extent to which the latter obstruct more or less the channel 14, and this exerts a braking action on the partition 15 and consequently on the drum 3 and the wheel integral therewith. A calculated portion of the hydraulic fluid within the channel 14 is permitted, with the help of the pressure produced by braking action, to escape through the port 25' or 30', and to flow through the conduits 25, 26 and thence through the radiator 28 in which it is cooled so that such fluid may in no event become overheated. This copes too with the expansion of the fluid due to heat and the same quantity of fluid comes back cooled by the opposite port where depression occurs.

Figure 3 shows the brake pedal 35 connected by its rod arrangement 36 with a plate 37, acting through a loaded spring 38 on a plate 39 connected by two rods 40, 41 with two pistons 42, 43 pushing back the control liquid in passages 13, 13a. Thus, when the pedal 35 is depressed, the pistons 42, 43 push back the liquid through the passages 13, 13a into the chambers 12, 12a, to project the vanes 7 to 10 as described. The braking pressure generated in the channel 14 is exerted, as explained above, against the cam shoulders 31 in one direction and 32 in the other direction, or the bevels 33 in one direction and 34 in the other direction to vary the degree of projection of the vanes according to the pressure generated in the chambers 12, 12a, as explained above. Further, when the braking pressure generated inside the channel 14 between one of the vanes and the wall 15 or 15" exceeds the force of the spring 38, the latter is compressed, thus preventing the exertion of an excessive braking force. The spring 38 is loaded in a suitable manner so as to prevent this excessive braking and thus serves as a moderator to prevent all accidents, such as a bursting of the brake; it permits only a calculated pressure inside the brake, producing a totally uniform deceleration, permitting the use of any kind of fluid, according to the fluid's possible viscosity variations, keeping the same braking power in spite of a part of the fluid escaping for cooling purpose, preventing the driver from being obliged to act on the pedal in order to ensure the application of the same braking power, keeping the braking action on, even if a wheel's rotation is diminished through lack of adherence, suppressing any diminution of braking power that could be due to any wear, especially the one occurring between the sides of the vanes, when they are out, and the rotating drum walls, preventing contact between the top of the vanes and the rotative drum before a practical full stop would be a cause of important wear.

During braking, the liquid, forced back into the chambers 12, 12a, to project the vanes, exerts a reaction inside the channels 13, 13a, which pushes valves 44, 45 into the ducts 26, 29, Fig. 3, to throttle or stop the circulation in the cooling circuit completely at the end of the braking; this allows an efficient braking by stopping the piping placed on the side of the partition which receives the braking pressure to prevent the liquid from escaping on this side during rest. It is obvious that these valves illustrate schematically a means for obturating the ducts starting the liquid in the cooling circuit and might be replaced by any usual checking valves used in hydraulics controlled by the braking pressure.

Figure 3a shows a modification wherein a single piston 46 with a rod 47 slides inside a single cylinder 48 and pushes back from the latter the control fluid in the two passages 13, 13a. The rod 47 of said piston is connected with the plate 39a on which the spring 38 bears.

According to Figure 4, which corresponds exactly in its right hand part to Figure 2, the duct 26 opens into a tank 27a connected with a second tank 27b on one hand, and passing through the cooling radiator 28a, and on the other hand through a bypass 49. 50 designates a thermostat controlling a valve, not shown, and 51 designates a needle valve capable of obturating the bypass 49, and which is supported by a float 52.

Normally, the hot liquid arriving through the duct 26 into the tank 27a passes through the radiator 28a Fig. 4 in which it is cooled and reaches the tank 27b from which it is brought back to the brake through the channel 29. If the level of the liquid contained in the tank 27b drops abnormally, the float 52 moves down and the needle valve 51 opens the bypass 49 so that the liquid passes directly from the tank 27a through the bypass 49 into the tank 27b. This is a safety device in case the temperature of the fluid in radiator 28a has no time to be cooled enough. In this case, the thermostat 50 closes the outlet obturator from the radiator 28a so that the liquid can no longer pass to the tank 27b; the level drops inside the latter and the relatively hot liquid which is in the tank 27a flows directly through the bypass 49 to this tank 27b. Normally a minimum temperature is constantly maintained in the liquid in this tank 27b, which comes back to the brake through the duct 29. This system makes it possible to cool the liquid outside of the braking periods, thus allowing the use of a small size radiator.

Although certain specific embodiments of the invention have been shown and described, it is obvious that many modifications thereof are possible. The invention, therefore, is not to be restricted except insofar as is necessitated by the prior art and by the spirit of the appended claims.

What I claim is:

1. A hydraulic brake which comprises, in combination, a sealed drum for attachment to a rotatable member, such as a wheel, a non-rotatable axle member about which said drum is rotatably mounted, a core fixed on said axle and fitting within said drum substantially from wall to wall thereof, said core having a smaller diameter than said drum to form an annular passage therebetween for containing an incompressible fluid, radial slots in said core and extending across the axial width thereof, vanes slidable in said slots and extending the length thereof to substantially span the distance between the walls of said drum, a partition extending on 90° across the width of said drum and dividing the annular passage, cam guides extending inwardly from the sides of said drum, the cam surfaces of said guides coinciding with the free edge of said partition, said guides extending on either side of said partition for a quarter of the circumference of said drum, fluid passageways in said axle member, each connected with one of said core slots, said vanes having plungers extending from their inner edges into said passageways, a master cylinder including a piston, a fluid connection between said passageways and said master cylinder, whereby said vanes may be operated by fluid pressure from said master cylinder by actuation of said piston, surfaces on the outer ends of said vanes, one of them being constantly subjected to the pressure built up in said passage, operating means for actuating said piston and including a control member and a resilient calibrated device interposed between said control member and said piston for compressing the vane-operating control liquid.

2. A hydraulic brake comprising, in combination, a sealed drum for attachment to a rotatable member, such as a wheel, a non-rotatable axle member about which said drum is rotatably mounted, a core fixed on said axle and fitting within said drum substantially from wall to wall thereof, said core having a smaller diameter than said drum to form an annular passage therebetween for containing an incompressible fluid, radial slots in said core and extending across the axial width thereof, vanes slidable in said slots and extending the length thereof to substantially span the distance between the walls of said drum, a partition extending on 90° across the width of said drum and dividing the annular passage, cam guides extending inwardly from the sides of said drum, the cam surfaces of said guides coinciding with the free edge of said partition, said guides extending on either side of said partition for a quarter of the circumference of said drum, an incompressible fluid filling at least a part of the annular passage, fluid passageways in said axle member, each connected with one of said core slots, plungers formed at the base of said vanes and extending into said passageways, a hydraulic master cylinder including a piston, a fluid connection between said passageways and said hydraulic master cylinder, whereby said vanes may be operated by fluid pressure from said master cylinder by actuation of said piston, surfaces on the outer ends of said vanes, one of them being constantly subjected to the pressure built up in said passage, a brake pedal, a rod arrangement connected with said pedal, a pair of plates respectively connected with said rod arrangement and said piston, and a loaded spring interposed between said plates.

3. A hydraulic brake which comprises, in combination, a sealed drum for attachment to a rotatable member, such as a wheel, a non-rotatable axle member about which said drum is rotatably mounted, a core fixed on said axle and fitting within said drum substantially from wall to wall thereof, said core having a smaller diameter than said drum to form an annular passage therebetween for containing an incompressible fluid, radial slots in said core and extending across the axial width thereof, vanes slidable in said slots and extending the length thereof to substantially span the distance between the walls of said drum, a partition extending on 90° across the width of said drum and dividing the annular passage, cam guides extending inwardly from the sides of said drum, the cam surfaces of said guides coinciding with the free edge of said partition, said guides extending on either side of said partition for a quarter of the circumference of said drum, fluid passageways in said axle member, each connected with one of said core slots, said vanes having plungers extending from their inner edges into said passageways, a master cylinder including a piston, a fluid connection between said passageways and said master cylinder, whereby said vanes may be operated by fluid pressure from said master cylinder by actuation of said piston, surfaces on the outer ends of said vanes, one of them being constantly subjected to the pressure built up in said passage, operating means for actuating said piston and including a control member, a resilient calibrated device interposed between said control member and said piston for compressing the vane-operating control liquid, a pair of channels in said partition and respectively opening through the opposite end faces of said partition, a pair of circular channels around said axle member, a pair of ducts respectively connecting one of said partition channels with one of said circular channels, a tank, a cooling radiator in communication with said tank, an exhaust duct between one circular channel and said tank, and a return duct between said radiator and the other circular channel for supplying cooled liquid through the other partition channel.

4. A hydraulic brake which comprises, in combination, a sealed drum for attachment to a rotatable member such as a wheel, a non-rotatable axle member about which said drum is rotatably mounted, a core fixed on said axle and fitting within said drum substantially from wall to wall thereof, said core having a smaller diameter than said drum to form an annular passage therebetween for containing an incompressible fluid, radial slots in said core and extending across the axial width thereof, vanes slidable in said slots and extending the length thereof to substantially span the distance between the walls of said drum, a partition extending on 90° across the width of said drum and dividing the annular passage, cam guides extending inwardly from the sides of said drum, the cam surfaces of said guides coinciding with the free edge of said partition, said guides extending on either side of said partition for a quarter of the circumference of said drum, fluid passageways in said axle member, each connected with one of said core slots, said vanes having plungers extending into said passageways from their inner edges, a master cylinder including a piston, a fluid connection between said passageways and said master cylinder, whereby said vanes may be operated by fluid pressure from said master cylinder by actuation of said piston, surfaces on the outer ends of said vanes, one of them being constantly subjected to the pressure built up in said passage, operating means for actuating said piston and including a control member, a resilient calibrated device interposed between said control member and said piston for compressing the vane-operating control liquid, a pair of ducts opening through the opposite end faces of said partitions, a pair of channels in said axle member and respectively communicating with said ducts, a first tank in communication with one of said channels for receiving hot liquid from the pressure side of said partition, a second tank below said first tank and communicating with the other of said channels, a cooling radiator between said tanks and communicating therewith, a thermostatic valve between said radiator and said second tank to stop communication therebetween when the temperature of the liquid is below a predetermined limit, a by-pass connected directly between said tanks, and a float valve in said second tank and controlling said by-pass.

5. A hydraulic brake which comprises, in combination, a sealed drum for attachment to a rotatable member such as a wheel, a non-rotatable axle member about which said drum is rotatably mounted, a core fixed on said axle and fitting within said drum substantially from wall to wall thereof, said core having a smaller diameter than said drum to form an annular passage therebetween for containing an incompressible fluid, radial slots in said core and extending across the axial width thereof, vanes slidable in said slots and extending the length thereof to substantially span the distance between the walls of said drum, a partition extending on 90° across the width of said drum and dividing the annular passage, cam guides extending inwardly from the sides of said drum, the cam surfaces of said guides coinciding with the free edge of said partition, said guides extending on either side of said partition for a quarter of the circumference of said drum, fluid passageways in said axle member, each connected with one of said core slots, said vanes having plungers extending from their inner edges into said passageways, a master cylinder including a piston, a fluid connection between said passageways and said master cylinder, whereby said vanes may be operated by fluid pressure from said master cylinder by actuation of said piston, surfaces on the outer ends of said vanes, one of them being constantly subjected to the pressure built up in said passage, operating means for actuating said piston and including a control member, a resilient calibrated device interposed between said control member and said piston for compressing the vane-operating control liquid, a pair of channels in said partition and respectively opening through the opposite end faces of said partition, a pair of circular channels around said axle member, a pair of ducts respectively connecting one of said partition channels with one of said circular channels, a tank, a cooling radiator in communication with said tank, an exhaust duct between one circular channel and said tank, and a return duct between said radiator and the other circular channel for supplying cooled liquid through the other partition channel, and non-return valves operating under the reaction of the control pressure at the end of the braking period for cutting off the cooling circuit.

References Cited in the file of this patent

UNITED STATES PATENTS

| | | |
|---|---|---|
| 1,599,439 | Staude | Sept. 14, 1926 |
| 1,614,119 | Giovannini | Jan. 11, 1927 |
| 1,631,800 | Dotsch | June 7, 1927 |
| 1,939,605 | Dempsey | Dec. 12, 1933 |
| 2,065,203 | Aikman | Dec. 22, 1936 |
| 2,232,252 | Mathey | Feb. 18, 1941 |
| 2,512,248 | Gassot | June 20, 1950 |

FOREIGN PATENTS

| | | |
|---|---|---|
| 634,271 | France | Nov. 9, 1927 |
| 882,966 | France | Mar. 15, 1943 |